UNITED STATES PATENT OFFICE.

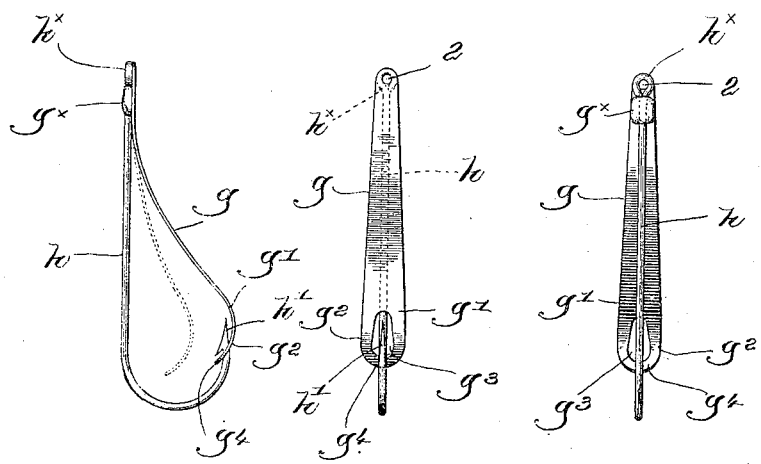

HENRY A. HOMAN, OF OMAHA, NEBRASKA.

FISH-HOOK.

No. 808,239. Specification of Letters Patent. Patented Dec. 26, 1905.

Application filed September 2, 1903. Serial No. 171,577.

*To all whom it may concern:*

Be it known that I, HENRY A. HOMAN, a citizen of the United States, residing at Omaha, county of Douglas, and State of Nebraska, have invented an Improvement in Fish-Hooks, of which the following description, in connection with the accompanying drawings, is a specification, like characters on the drawings representing like parts.

This invention has for its object the production of a simple and efficient fish-hook which can be drawn through weeds, grass, or other obstacles without catching thereon or becoming clogged, while its efficiency when struck by the fish is not impaired.

One of the greatest annoyances known to fishermen and of common occurrence is the catching or entangling of the hook in weeds, grass, or some other obstacle encountered by the hook in passing through the water, frequently resulting in the loss of the hook and more or less of the line.

In my present invention I have provided a guard for the point of the hook, so constructed and arranged that normally the point is hooded or protected in such a manner that the hook can be drawn through weeds or grass with entire freedom. As the point is protected, it cannot stick into tree branches, snags, or similar obstacles in the water, but when the fish strikes the guard instantly uncovers the point and it takes hold of the fish in the usual way.

The novel features of my invention will be described fully in the subjoined specification and particularly pointed out in the following claims.

Figure 1 is a side elevation of a fish-hook with a guard embodying one form of my invention applied thereto. Fig. 2 is a front elevation thereof, and Fig. 3 is a rear elevation.

The fish-hook proper is of well-known construction, comprising a shank $h$, herein shown as having an eye or loop $h^\times$ and bent or bowed to form the hook, the point $h'$ being barbed in usual manner. A guard $g$, preferably made as a blade-like strip of suitable spring metal, is rigidly attached at one end to the shank of the hook, as by solder $g^\times$, in such manner that the connection will be smooth and not catch or become entangled. The guard is tapered or narrowed from its free end toward the eye $h^\times$ (see Figs. 2 and 3) and has a hole 2 registering with the eye, as herein shown, so that the line when attached will pass through the eye and the hole in the guard. From its point of attachment the resilient guard is curved outward toward and beyond the point of the hook, as at $g'$, (see Fig. 1,) and then it is turned or curved inward, as at $g^2$. An opening $g^3$ is made in the inturned portion to permit the point and barb of the hook to pass therethrough beneath the part $g'$ of the guard, so that the latter normally protects or hoods the point. I have herein shown the opening $g^3$ as an elongated slot or hole of such length that the tip $g^4$ of the guard at the outer end of the hole will normally pass under the barb, so that if the hook is flexed by longitudinal or lateral strain the part $g^4$ will lock with the guard. The blade-like form of the guard permits the requisite resiliency in the direction of its length, but makes it stiff or substantially unyielding laterally, so that pulling or twitching of the hook sidewise or forward or backward in passing weeds or other obstacles will not cause the point to become detached or uncovered by the guard. The point of the hook normally passes beneath the guard from its outer side through the opening or slot $g^3$, Figs. 2 and 3, and hence the point end of the hook cannot be bent laterally out of coöperative position with relation to the guard. The guard yields readily to the strike of the fish and instantly uncovers the point of the hook, as shown in dotted lines, Fig. 1, and if the hook passes through the gills the guard will return to normal position and lock with the barb, so that neither the management of the hook and line nor the struggles of the fish can dislodge it.

I prefer to make the guard of some bright shining metal or to brighten or polish its outer face, so that it may also serve as a lure for the fish.

The hook and guard herein shown can be readily used with a trailer for bait-casting, if desired, the trailer being hung on the bow of the hook.

Viewing Fig. 1, it will be seen that the hook and guard in side elevation is somewhat pear-shaped, with its smaller end at the eye of the shank, so that it will readily pass through or by obstacles which may be encountered. So, too, the tapering of the guard, as viewed from front or rear, Figs. 2 or 3, assists in a similar manner.

My invention is not restricted to the precise construction and arrangement shown and described, as the same may be varied or modified by those skilled in the art without departing from the spirit and scope of my invention.

Having described my invention, what I claim as new, and desire to secure by Letters Patent, is—

1. A fish-hook, a laterally stiff but longitudinally-resilient guard rigidly attached to the shank of the hook, said guard having an opening at its free end to normally receive the entire point and barb of the hook whereby the point and barb are normally located on the inside of the spring.

2. A fish-hook, a laterally stiff but longitudinally-resilient guard rigidly attached at one end to the shank and bent outward, the free end of the guard being inturned and having an opening to be normally entered by the entire point and barb of the hook from the outer face of the guard, whereby the latter projects beyond and protects the point and barb.

3. A fish-hook having a shank provided with an eye, and a resilient, blade-like guard rigidly attached at one end to the shank adjacent the eye and curved outward therefrom, the guard increasing in width toward its free end and being inturned thereat and provided with an opening to receive the entire point and barb of the hook, the resiliency of the guard normally causing it to project beyond and thereby protect the point.

4. A fish-hook having a barbed point, and a blade-like, resilient guard rigidly attached at one end to the hook-shank and curved outward therefrom toward the point of the hook, the free end of the guard being inturned and provided with an elongated opening near its tip to normally receive the entire point and barb, the resiliency of the guard causing its tip beyond the opening to project below the barb adjacent the inner side of the hook.

5. A fish-hook, and a longitudinally-resilient metallic guard rigidly attached at one end to the hook-shank, the opposite, free end of said guard normally extending beyond the point of the hook and being inturned thereat and provided with an opening into which the point normally projects, the outer face of the guard being made bright to serve as a lure.

6. A fish-hook having a barbed point, and a blade-like spring-guard rigidly attached at one end to the hook-shank and curved outward therefrom toward and beyond the point of the hook and then incurved across it and having a hole to receive the point, the tip of the guard engaging the inner side of the hook below and locking with the barb when the hook is flexed by longitudinal or lateral strain.

7. An improved article of manufacture comprising a hook having a suitable point and barb and a guard attached to the shank of the hook and provided at its free extremity with a perforation fitting over said barb and adjacent to the hook-point with a projection protecting said point and barb for the purpose set forth.

In testimony whereof I have signed my name to this specification in the presence of two subscribing witnesses.

HENRY A. HOMAN.

Witnesses:
JOHN M. WESTERFIELD,
ELLEY H. WESTERFIELD.